United States Patent
Eddington et al.

(10) Patent No.: US 11,953,701 B2
(45) Date of Patent: Apr. 9, 2024

(54) SHAPE MEMORY ALLOY ACTUATOR ASSEMBLY FOR OPTICAL IMAGE STABILISATION

(71) Applicant: CAMBRIDGE MECHATRONICS LIMITED, Cambridge (GB)

(72) Inventors: Robin Eddington, Cambridge (GB); James Howarth, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 1034 days.

(21) Appl. No.: 16/490,250

(22) PCT Filed: Mar. 2, 2018

(86) PCT No.: PCT/GB2018/050545
§ 371 (c)(1),
(2) Date: Aug. 30, 2019

(87) PCT Pub. No.: WO2018/158590
PCT Pub. Date: Sep. 7, 2018

(65) Prior Publication Data
US 2020/0073140 A1    Mar. 5, 2020

(30) Foreign Application Priority Data
Mar. 2, 2017    (GB) .................................... 1703356

(51) Int. Cl.
*G02B 27/64*    (2006.01)
*F03G 7/06*    (2006.01)
(Continued)

(52) U.S. Cl.
CPC ........... *G02B 27/646* (2013.01); *F03G 7/065* (2013.01); *G02B 7/1821* (2013.01); *G03B 5/00* (2013.01);
(Continued)

(58) Field of Classification Search
CPC ..... G02B 27/646; G02B 7/1821; F03G 7/065; G03B 5/00; G03B 2205/0076;
(Continued)

(56) References Cited

U.S. PATENT DOCUMENTS

| | | |
|---|---|---|
| 4,500,170 A | 2/1985 | Montesanto |
| 9,392,188 B2 | 7/2016 | Shabtay et al. |

(Continued)

FOREIGN PATENT DOCUMENTS

| | | |
|---|---|---|
| CN | 101896719 A | 11/2010 |
| CN | 102795163 A | 11/2012 |

(Continued)

OTHER PUBLICATIONS

International Search Report and Written Opinion issued in PCT/GB2018/050545, dated Jul. 5, 2018; ISA/EP.
(Continued)

*Primary Examiner* — Usman A Khan
(74) *Attorney, Agent, or Firm* — Haley Guiliano LLP (57) ABSTRACT

An SMA actuator is arranged to tilt the mirror in a zoom camera to effect optical image stabilization. The actuator may comprise four angled-V SMA wires. The actuator may alternatively comprise a gimbal flexure and SMA wires. In this case there may be four SMA wires or two SMA wires and two springs. The SMA wires may be straight wires or wires hooked in a V shape.

26 Claims, 10 Drawing Sheets

(51) Int. Cl.
*G02B 7/182* (2021.01)
*G03B 5/00* (2021.01)
*H04N 23/55* (2023.01)
*H04N 23/68* (2023.01)

(52) U.S. Cl.
CPC ......... *H04N 23/55* (2023.01); *H04N 23/6812* (2023.01); *G03B 2205/0076* (2013.01)

(58) Field of Classification Search
CPC ............ H04N 5/2254; H04N 5/23258; H04N 5/2328; H04N 23/55; H04N 23/6812; H04N 23/685
USPC .......................................... 348/823; 359/823
See application file for complete search history.

(56) References Cited

U.S. PATENT DOCUMENTS

| | | | | |
|---|---|---|---|---|
| 2011/0179786 | A1* | 7/2011 | Topliss | G03B 3/10 60/527 |
| 2011/0181955 | A1* | 7/2011 | Cho, II | G02B 26/0833 359/555 |
| 2011/0222176 | A1* | 9/2011 | Browne | B60R 1/074 359/872 |
| 2015/0042870 | A1 | 2/2015 | Chan et al. | |
| 2015/0274078 | A1 | 10/2015 | Alacqua et al. | |
| 2015/0323856 | A1* | 11/2015 | Nordhaug | F16M 11/14 348/208.7 |
| 2015/0346507 | A1* | 12/2015 | Howarth | F03G 7/06 60/527 |
| 2015/0373252 | A1 | 12/2015 | Georgiev | |
| 2016/0291295 | A1 | 10/2016 | Shabtay et al. | |
| 2017/0075192 | A1* | 3/2017 | Brown | G03B 5/04 |
| 2017/0242225 | A1* | 8/2017 | Fiske | H04N 23/57 |
| 2018/0171991 | A1* | 6/2018 | Miller | F16M 11/048 |
| 2019/0104258 | A1 | 4/2019 | Cohen et al. | |

FOREIGN PATENT DOCUMENTS

| | | | | |
|---|---|---|---|---|
| CN | 103168264 | A | 6/2013 | |
| CN | 104718376 | A | 6/2015 | |
| CN | 104956254 | A | 9/2015 | |
| DE | 102007051291 | A1 | 4/2009 | |
| WO | WO-2010029316 | A2 | 3/2010 | |
| WO | WO-2010089529 | A1 | 8/2010 | |
| WO | WO-2013175197 | A1 | 11/2013 | |
| WO | WO-2016081567 | A1 * | 5/2016 | .......... G02B 13/001 |
| WO | WO-2016166730 | A1 | 10/2016 | |
| WO | WO-2016178152 | A1 | 11/2016 | |
| WO | WO-2016207754 | A1 | 12/2016 | |
| WO | WO-2017037688 | A1 | 3/2017 | |
| WO | 2018135732 | A1 | 7/2018 | |
| WO | WO-2018154421 | A1 | 8/2018 | |
| WO | WO-2018158590 | A1 | 9/2018 | |
| WO | WO-2018167581 | A1 | 9/2018 | |
| WO | WO-2019021145 | A1 | 1/2019 | |

OTHER PUBLICATIONS

Chinese Office Action dated Apr. 14, 2021 regarding Application No. 201880014829.3.
Search and Examination Report of GB Application No. 1914154.8 dated Jun. 14, 2022 (4 pages).

* cited by examiner

SHAPE MEMORY ALLOY ACTUATOR ASSEMBLY FOR OPTICAL IMAGE STABILISATION

CROSS-REFERENCE TO RELATED APPLICATIONS

This application is a 371 U.S. National Phase of International Application No. PCT/GB2018/050545, filed Mar. 2, 2018, which claims the benefit of Great Britain Patent Application No. GB 1703356.4, filed on Mar. 2, 2017. The entire disclosures of the above applications are incorporated herein by reference.

The present invention relates to a shape memory alloy (SMA) actuator assembly, an actuation system, a camera assembly and a mobile phone. The SMA actuator assembly may be for providing optical image stabilisation (OIS).

In a camera, the purpose of OIS is to compensate for camera shake, that is vibration of the camera, typically caused by user hand movement, that degrades the quality of the image captured by the image sensor. Mechanical OIS typically involves detecting the vibration by a vibration sensor such as gyroscope sensor, and controlling, on the basis of the detected vibration, an actuator arrangement that adjusts the camera apparatus to compensate for the vibration. Several techniques for adjusting the camera apparatus are known. OIS by processing of a captured image is possible in principle but requires significant processing power. Accordingly, there has been developed mechanical OIS in which the optical system of the camera is adjusted mechanically. Known OIS actuators move a lens or an image sensor to counteract image shake.

A number of actuator arrangements employing mechanical OIS techniques are known and applied successfully in relatively large camera apparatuses, such as digital still cameras, but are difficult to miniaturise. Cameras have become very common in a wide range of portable electronic equipment, for example mobile telephones and tablet computers, and in many such applications miniaturisation of the camera is important.

There is a market requirement for OIS in a folded camera for telephoto (long focal length) or zoom, such as a folded camera as part of a dual camera system. A folded camera works by folding the light, via a mirror or a prism, allowing a longer focal length. A zoom lens is a lens where the lens elements can be moved relative to one another to change the focal length of the lens. For a typical optical zoom lens, there are at least two lens groups that move independently of each other along the optical axis relative to the image sensor, but in a relational manner to each other. There are additionally typically further lens group that remain stationary relative to the image sensor. A folded camera having a telephoto or zoom lens can take up more space, thereby making miniaturisation more difficult. The very tight packaging of components in miniature camera apparatuses presents great difficulties in adding OIS actuators within the desired package.

In one type of mechanical OIS, the camera unit comprises an image sensor and a lens system for focusing an image on the image sensor which camera unit is tilted relative to the support structure of the camera assembly around two notional axes that are perpendicular to each other and to the light-sensitive region of the image sensor. Such a type of OIS will be referred to herein as "OIS-tilt". WO 2010/029316 and WO 2010/089529 each disclose camera assemblies of this type in which a plurality of SMA actuator wires are arranged to drive tilting of the camera unit.

In another type of mechanical OIS, a lens assembly is moved orthogonally to the optical axis of the at least one lens. Such a type of OIS will be referred to herein as "OIS-lens shift". OIS-lens shift has the potential to reduce the size of the overall package of the camera as compared to OIS-tilt because only the lens assembly is moved and the lateral movement thereof requires less clearance than tilting the entire camera. WO 2013/175197 discloses a camera assembly of this type in which a plurality of SMA actuator wires are arranged to drive movement of the lens assembly.

Some miniature cameras have a folded optics arrangement, in which plural lens elements have their optical axis orthogonal to a first lens element through which light entering the camera first passes. A mirror or prism can be used to fold the optical path. An actuator can be used to tilt the mirror in an appropriate manner to compensate for user hand motion to stabilise the image and improve image quality. In such a camera, sufficient clearance needs to be provided to allow for tilting of the mirror.

An aspect of the present invention is concerned with an alternative actuator assembly for providing OIS in a camera with a folded optics arrangement.

According to this aspect of the present invention, there is provided an SMA actuator assembly to tilt a movable object comprising a mirror or prism relative to a static part wherein the actuator assembly is arranged to tilt the movable object about at least one axis and comprises a plurality of SMA wires.

This aspect of the present invention therefore provides relative movement between the mirror or prism and the static part (e.g. the image sensor and the lens assembly provided in a camera in which the SMA actuator assembly may be incorporated). That relative movement provides OIS. As the movement is driven by plural SMA actuator wires, this achieves advantages. For example, the use of SMA actuator wires facilitates miniaturisation compared to other types of actuator (e.g. voice coil motor), and the dimensions may be reduced.

The actuator assembly may be arranged to tilt the movable object about only one axis. This simplifies the structure of the actuator assembly. Stabilization about a second axis may be provided elsewhere in the lens system. Alternatively, the actuator assembly may be arranged to tilt the movable object about two axes, which may be perpendicular to each other. This increases the freedom of movement of the mirror or prism, which may help to stabilise the image more accurately.

The actuator assembly may comprise at least four SMA wires. This helps to tilt the mirror or prism about two perpendicular axes.

The SMA wires may be hooked at a midpoint, with the two sections of wire on either side of the midpoint extending along different sides of the mirror or prism. This can increase movement of the mirror or prism for a given ratio of contraction of the SMA wires.

The mirror or prism may be mounted on a gimbal. The gimbal may be arranged to allow the mirror or prism to tilt by torsion of a torsional part of the gimbal. This may improve the simplicity of the device while allowing tilting around the axis. Alternatively, the gimbal may comprise a rocking pivot arranged to allow the mirror or prism to tilt.

In a first aspect there is provided an SMA actuator to tilt a movable object relative to a static part wherein the actuator is arranged to tilt the movable object about two perpendicular axes and comprises four angled-V SMA wires.

In a second aspect there is provided an SMA actuator to tilt a movable object relative to a static part wherein the actuator is arranged to tilt the movable object about two perpendicular axes and comprises a gimbal flexure and four SMA wires.

In a third aspect the four SMA wires are each connected at one end to the static part and at the other end to the movable object.

In a fourth aspect the four SMA wires are each fixed at both ends to the static part and hooked at their midpoint over a feature on the movable object.

In a fifth aspect the four SMA wires are each fixed at both ends to the movable object and hooked at their midpoint over a feature on the static part.

In a sixth aspect there is provided an SMA actuator to tilt a movable object relative to a static part wherein the actuator is arranged to tilt the movable object about two perpendicular axes and comprises a gimbal flexure and two SMA wires and two springs.

In a seventh aspect there is provided an SMA actuator to tilt a movable object relative to a static part wherein the actuator is arranged to tilt the movable object about two perpendicular axes and comprises a gimbal flexure and two SMA wires and two springs with levers.

In an eighth aspect the gimbal flexure is a one piece steel flexure cut or etched from a steel sheet.

In a ninth aspect the movable object is a mirror.

In a tenth aspect the actuator is used to effect optical image stabilization in a telephoto or zoom camera.

In an eleventh aspect the camera comprises lenses of at most 10 mm diameter.

To allow better understanding, an embodiment of the present invention will now be described by way of non-limitative example with reference to the accompanying drawings in which.

Figure 1:
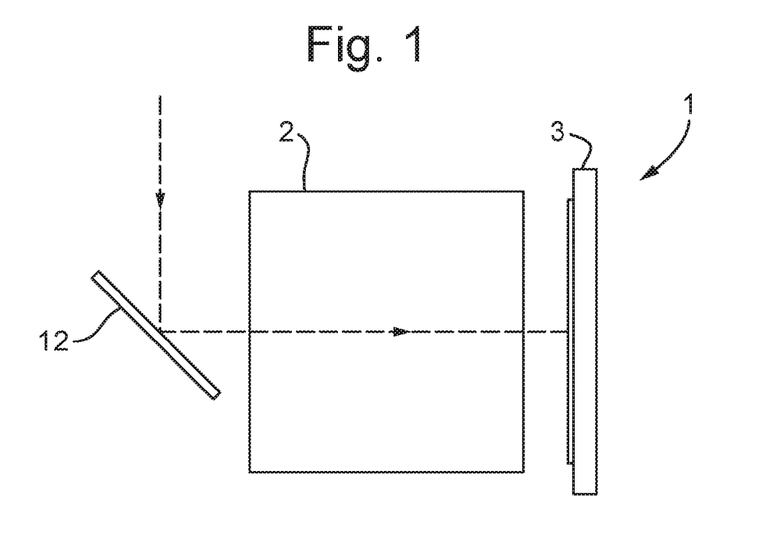
FIG. 1 is a schematic cross-sectional view of a camera assembly.

A camera assembly 1 that incorporates OIS in accordance with the present invention is shown in FIG. 1. The camera assembly 1 may be incorporated in a camera apparatus such as a dual camera system. The camera assembly 1 is to be incorporated in a portable electronic device such as a mobile telephone, or tablet computer. Thus, miniaturisation is an important design criterion.

For example, a dual camera system may be required to have a maximum length of 19 mm, a maximum width of 9.5 mm and a maximum z-height of 5.9 mm. Hence, the camera assembly 1 shown schematically in FIG. 1 may be required to have a maximum length of 9.5 mm, a maximum width of 9.5 mm and a maximum z-height (the vertical direction in FIG. 1) of 5.9 mm.

The camera assembly 1 comprises a lens 2. For example, the lens 2 may be a zoom lens. Alternatively, the lens 2 may be a telephoto lens, for example. The present invention is not particularly limited to the type of the lens 2. When the lens 2 is a zoom lens, the lens 2 may comprise a plurality of individual lenses that can move relative to each other.

As shown in FIG. 1, the camera assembly 1 comprises an image sensor 3. The image sensor 3 has a light-sensitive region. The optical axis O is orthogonal to the light-sensitive region. The image sensor 3 captures an image and may be of any suitable type, for example a CCD (Charge-Coupled-Device) or CMOS (Complementary Metal-Oxide-Semiconductor) device. As is conventional, the image sensor 3 may have a rectangular light-sensitive region. Without limitation to the invention, in this example the camera assembly 1 is a miniature camera assembly in which the light-sensitive region of the image sensor 3 has a diagonal length of at most 12 mm.

Figure 2:
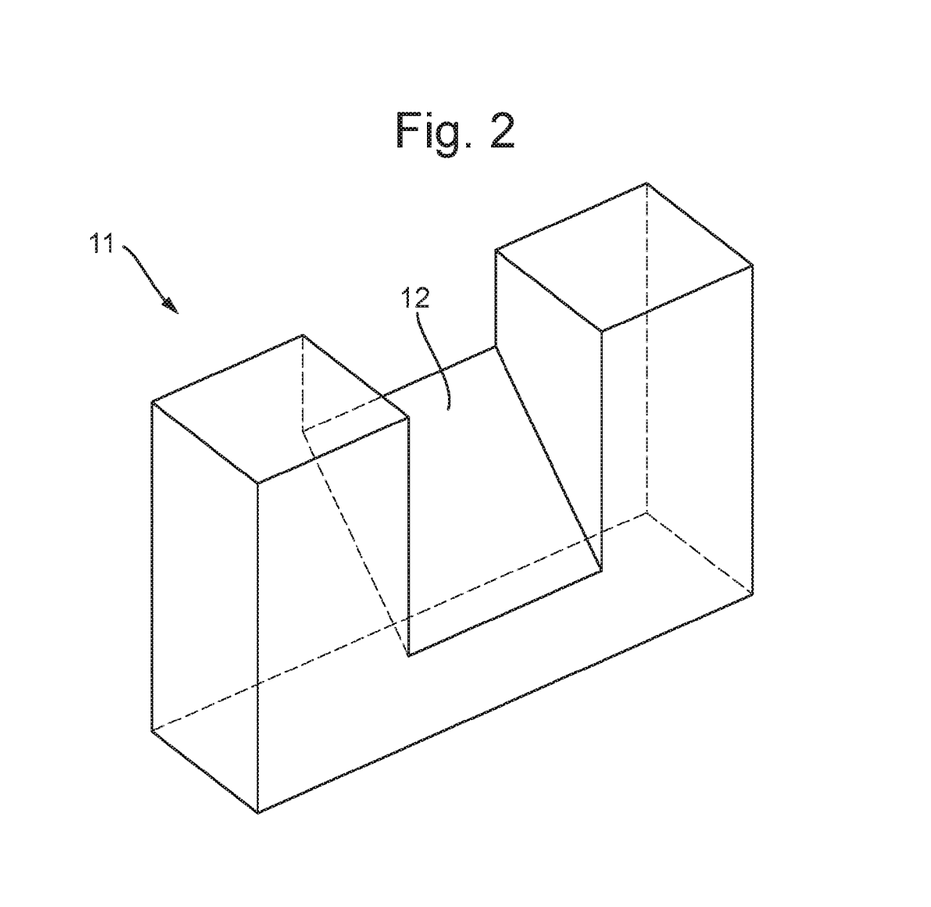
FIG. 2 is a perspective view of a mirror of an arrangement of the camera assembly.

As depicted in FIG. 2, the camera assembly 1 comprises a moveable object 11. The movable object 11 is for folding light entering the camera assembly 1. Light may enter the camera assembly 1 from above (in the orientation of FIG. 1) the object 11. The object 11 comprises a mirror 12 or prism. The mirror 12 or prism is configured to fold the incoming light so as to direct the light into the lens 2 and subsequently onto the image sensor 3. The light path is shown as a dotted line in FIG. 1.

In the description below, the embodiment of the invention will be described making reference to a mirror 12 being used. However, the invention is equally applicable to a prism being used the element that folds the light in the camera assembly 1.

The lens 2 and the image sensor 3 comprise a static part of the actuator assembly 10. The moveable object 11 can be tilted relative to the static part (e.g. the lens 2 and the image sensor 3) for providing OIS.

The lens 2 may have a length (the horizontal direction in FIG. 1) of about 5 mm. the image sensor 3 may have a length (the horizontal direction in FIG. 1) of about 0.65 mm, and may be positioned with a gap of about 0.8 mm from the lens 2. The movable object 11 may be positioned with a gap of about 0.5 mm from the other end of the lens 2.

For a camera assembly 1 that is to have a maximum length of 9.5 mm, this means that the length available for the actuator assembly (for moving the moveable object 12) is about 2.55 mm. Meanwhile the actuator assembly can have a maximum width (the direction into and out of the sheet in FIG. 1) of 9.55 mm and a maximum z-height of about 5.9 mm. Hence, the possible space envelope may be 2.5 mm×9.5 mm×5.9 mm. Of course, some of this space will be used by the mirror 12 or prism and the light path.

FIG. 2 is perspective view of the possible space envelope for the actuator assembly, once the position of the mirror 12 of the movable object 11 has been set. The mirror 12 may have width in the range from about 2 mm to about 5 mm, for example about 3 mm.

Figure 3:
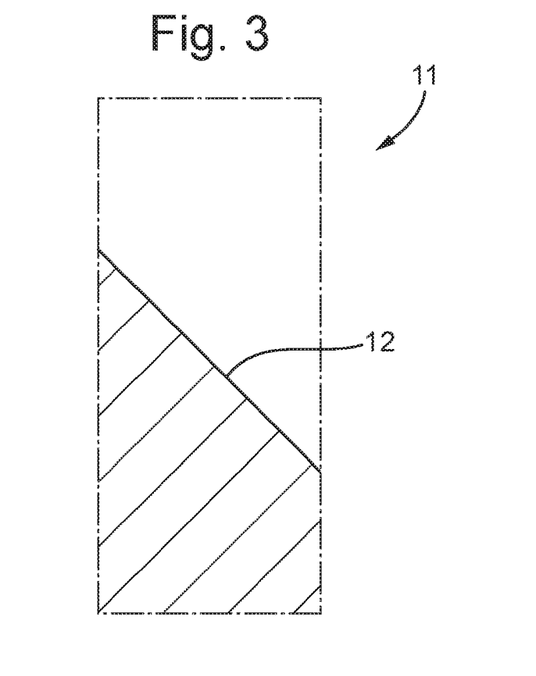
FIG. 3 is a cross-sectional view of the mirror of FIG. 2.

FIG. 3 is a schematic cross-sectional view of the perspective view shown in FIG. 2. In FIG. 3, the space shown below the mirror 12 of the moveable object 11 represents the main space available for the actuator assembly. The left hand (higher) end of the mirror 12 may be about 4.2 mm above the bottom of the available space. Meanwhile the right hand (lower) end of the mirror 12 may be only about 1.6 mm above the base of the space available.

The present invention relates to the actuator assembly 10, described in more detail below. The actuator assembly 10 is configured to tilt the movable object 11 relative to the static part (e.g. the lens 2 and the image sensor 3). The actuator assembly 10 is arranged to tilt the movable object 11 about at least one axis.

The actuator assembly 10 comprises a plurality of SMA wires. The SMA wires can be contracted to drive the actuator assembly 10. Hence, the actuator assembly 10 is an SMA actuator assembly.

The use of SMA actuator wires facilitates miniaturisation compared to other types of actuator, e.g. voice coil motor. The dimensions of the actuator may be reduced compared to voice coil motor arrangements.

Figure 4:
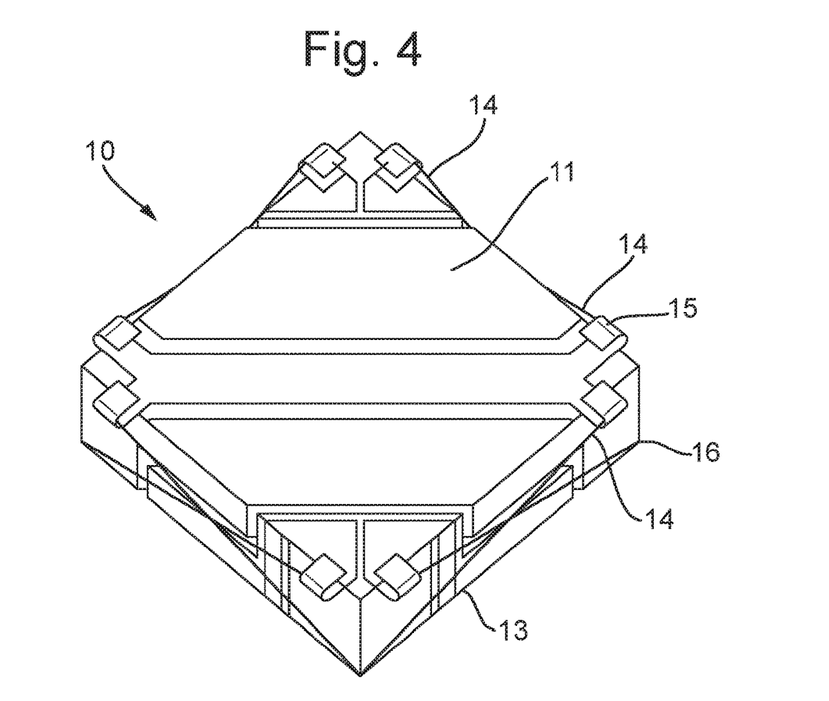
FIG. 4 is a schematic perspective view of an actuator assembly that may be applied in the camera assembly.

FIG. 4 schematically depicts an actuator assembly 10 according to one arrangement of the embodiment. As depicted in FIG. 4, the actuator assembly 10 comprises a plurality of SMA wires 14. The actuator assembly 10 is configured to move the movable object 11 relative to the static part, e.g. the lens 2 and the image sensor 3.

In the example shown in FIG. 4, the actuator assembly 10 is configured to tilt the movable object 11 about two non-parallel axes. For example, the non-parallel axes may be perpendicular. This provides greater flexibility of movement of the mirror 12 or prism. This may allow OIS to be effected for a greater range of different types of camera shake.

As depicted in FIG. 4, the actuator assembly 10 may comprise at least four SMA wires 14. In the example shown in FIG. 4, the SMA wires 14 extend around four edges of the moveable object 11. The design represented in FIG. 4 may function in a manner similar to the known camera tilt actuators, such as disclosed in WO 2010/029316.

Figure 5:
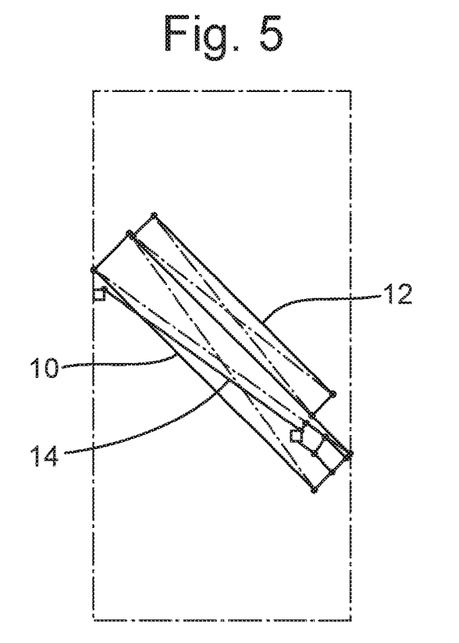
FIGS. 5 and 6 are cross-sectional views of alternative arrangements of the actuator assembly of FIG. 4.
Figure 6:
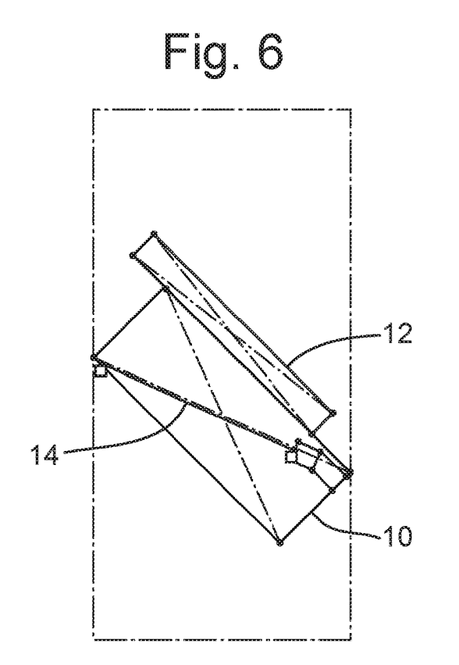

FIGS. 5 and 6 schematically depict in cross-section views of the actuator assembly 10 shown in FIG. 4. The difference between FIGS. 5 and 6 is the dimensions of the actuator assembly 10. The movable object 11 may comprise a moving platform onto which the mirror 12 or prism is mounted.

The actuator assembly 10 may comprise a suspension system. The suspension system is for supporting the moveable object 11 on the static part in a manner allowing the movable object to tilt. The movable object 11 may be allowed to tilt around two notional axes that are perpendicular to each other.

As depicted in FIG. 4, the actuator assembly 10 comprises a plurality of SMA wires 14 (also known as SMA actuators). The SMA wires 14 are each connected between the static part and the moveable object 11. The SMA wires 14 can be contracted. For example each SMA wire 14 can be heated leading to its contraction. The SMA wires 14 are arranged, on contraction, to drive displacement of the moveable object 11 relative to the static part.

The SMA wires 14 are arranged at different positions around the moveable object 11 so that the SMA wires 14 are arranged, on contraction to drive differential displacement, to drive tilting of the moveable object 11. Hence, by controlling contraction of the SMA wires 14, the moveable object 11 can be tilted about two perpendicular axes.

FIG. 5 schematically depicts a relatively thin actuator assembly 10. For example, the actuator assembly 10 may have a thickness (in the direction perpendicular to the reflecting plane of the mirror 12) of about 0.5 mm. Meanwhile, FIG. 6 depicts in cross-section a relatively thicker actuator assembly 10. For example, the actuator assembly 10 shown in FIG. 6 may have a thickness of about 1 mm.

For both thicknesses of actuator assembly 10, the SMA wires 14 can extend diagonally as shown in FIGS. 5 and 6. It is desirable to have SMA wires 14 of as long length as possible so as to increase the amount of tilting possible. It can be calculated that the maximum wire length for the relatively thinner actuator assembly shown in FIG. 5 is greater than for the relatively thicker actuator assembly 10 shown in FIG. 6. Hence, the actuator assembly 10 may be arranged to have a thickness of less than 1 mm, for example about 0.5 mm. For example, the maximum length of each SMA wire for the relatively thinner actuator assembly 10 shown in FIG. 5 may be calculated to be about 4.8 mm. meanwhile, the maximum length of the SMA wire 14 used in the relatively thicker actuator assembly 10 shown in FIG. 6 can be calculated to be about 4.2 mm.

As show in FIGS. 5 and 6, the centre of the mirror 12 may not be aligned with the rotational centre of the actuator assembly 10. It is not essential for the centres of the mirror 21 and the actuator assembly 10 to be aligned. However, it is desirable for the centres to be relatively closely aligned. A lack of alignment between the centres could cause problems depending on the size of the mirror 12.

There are various ways that the SMA wires 14 can be arranged in the actuator assembly 10 of FIG. 4. For example, as described in WO 2010/029316, the SMA wires 14 may each be connected at one end to the static part and at the other end to the moveable object 11. Hence, contraction of the SMA wires 14 moves the moveable part 11 relative to the static part.

Alternatively, the SMA wires 14 can be hooked at a midpoint. For example, the SMA wires can each be fixed at both ends to the static part and hooked at their midpoint at a feature of the moveable object 11. Alternately, the SMA wires 14 can be each fixed at both ends to the moveable object 11 and hooked at a midpoint at a feature of the static part.

As depicted in FIG. 4, in the case of hooking the SMA wires 14 at their midpoint, it is possible for the midpoint to be positioned at corners of the actuator assembly 10. In particular, the two sections of SMA wire on either side of the hooked part can be angled relative to each other when viewed in a direction perpendicular to the axis about which the moveable object 11 tilts.

The features (pivot elements) about which the SMA wires 14 are hooked are provided in the corners of the actuator assembly 10. Each SMA wire 14 extends around the corner with the two portions extending from the pivot elements 16 extending along a side of the actuator assembly 10. Thus, the two portions of SMA wire 14 extending from the pivot elements 16 each extend at an angle of less than 90° to a common notional line radial of the normal to the reflecting surface of the mirror 12.

This provides the advantage of increasing the effective length of the SMA wires 14 available within the constraints of a particular square footprint, albeit at the expense of complicating the arrangement slightly.

Alternatively, the pivot element 16 can be provided at a midpoint along the sides of the actuator assembly. In this case, each SMA wire creates a V-shape on one side of the actuator assembly 10. The operation is identical regardless of whether the pivot elements 16 are at the corners of the actuator assembly 10 (e.g. as shown in FIG. 4) or at the midpoints along the sides of actuator assembly 10.

As shown in FIG. 4, the SMA wires 14 are held at their ends by connection elements 15. For example, the connection elements 15 may be crimps. The connection elements 15 fix the ends of the SMA wires 14 to the static part or the moveable object 11.

Figure 7:
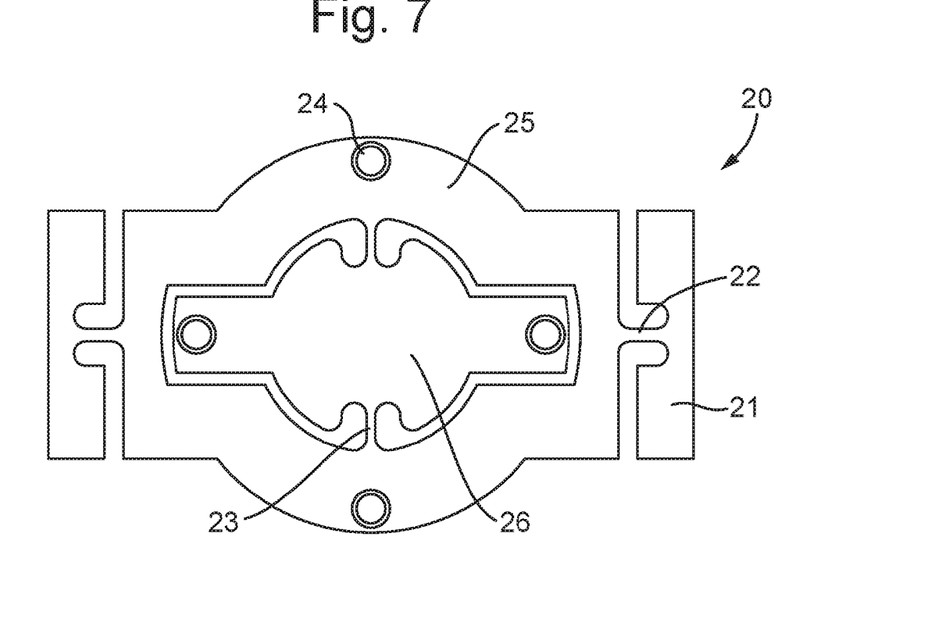
FIG. 7 is a plan view of a gimbal comprising a torsional part according to an arrangement of the actuator assembly.

FIG. 7 depicts in plan view a gimbal used in an arrangement of the embodiment of the invention. In the example shown in FIG. 7, the gimbal 20 comprises a one piece flexure.

The mirror 12 or prism is mounted on the central part of the gimbal 20. The gimbal 20 is arranged to allow the movable mirror 13 or prism to tilt about the one axis.

The gimbal shown in FIG. 7 comprises a torsional part 22. The torsional part 22 is configured to twist so that the outer platform 25 of the gimbal 20 rotates relative to the fixed part 21 of the gimbal 20. There are two fixed parts 21 on either end of the gimbal 20, with corresponding torsional parts 22 extending between the fixed part 21 and the outer platform 25.

As depicted FIG. 7, the gimbal 20 may be arranged to allow the mirror 12 or prism to tilt about two perpendicular axes. The gimbal 20 shown in FIG. 7 comprises further torsional parts 23 that extend between the outer platform 25 and the central platform 26 of the gimbal 20. The further torsional parts 23 are configured to twist so that the central platform 26 can rotate relative to the outer platform 25.

The gimbal 20 may comprise a one piece metal (e.g. steel) flexure. The gimbal 20 is designed to control tilt motion. FIG. 7 shows four actuation points 24 on the gimbal 20, the actuation points 24 represent points at which a force can be applied to the outer platform 25 and/or the central platform 26 of the gimbal 20 so as to cause tilt motion about the two perpendicular axes. According to a further alternative described in more detail later, instead of having four actuation points, there may be two actuations points and two spring preload points. In particular, for each axis of rotation, one of the actuation points 24 may be replaced by a spring preload point.

In an alternative arrangement, actuation of the gimbal 20 can be created from two stacked pieces (and optionally a spacer) to reduce the z-height if required.

Figure 8:
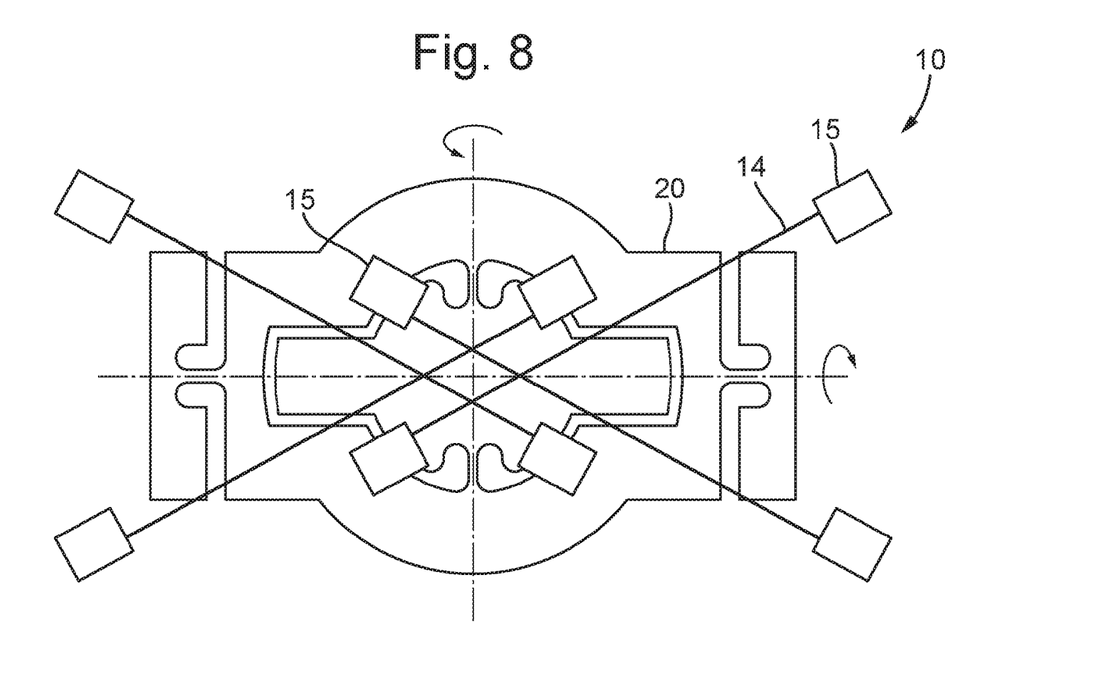
FIGS. 8 to 13 are schematic views of alternative arrangements for the SMA wires that may be applied to the gimbal shown in FIG. 7.

FIG. 8 schematically depicts actuation of the gimbal 20 according to an arrangement of the embodiment of the invention. As shown in FIG. 8, the actuator assembly 10 may comprise four SMA wires 14. Each SMA wire 14 is connected at one end to the static part and at the other end to the gimbal 20. The ends of the SMA wires 14 are connected via connection points 15 (e.g. crimps). Optionally, the SMA wires 14 may be mounted on a pillar attached to the central platform 26 of the gimbal 20.

The arrangement shown in FIG. 8 is an arrangement in which the SMA wires 14 extend a longer distance perpendicular to the axis shown in the up-down direction of FIG. 8 compared to how far the SMA wires 14 extend perpendicular to the axis extending in the left-right direction of FIG. 8. As a result, one axis has substantially more tilt amplification than the other.

Figure 9:
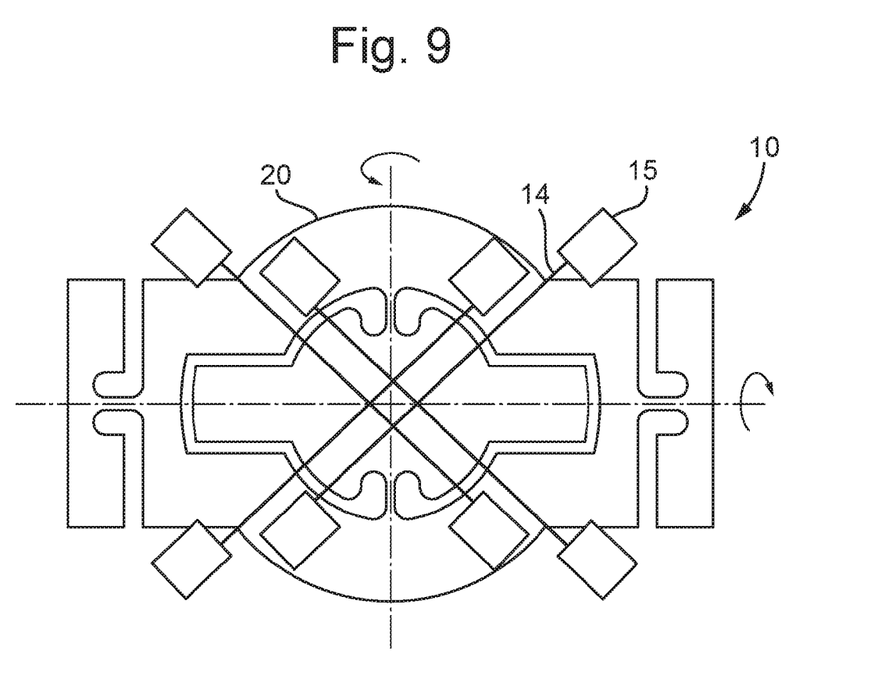

As depicted in FIG. 9, the SMA wires 14 can be shortened so as to make the axes symmetric in this respect. In particular, as shown in FIG. 9, the SMA wires 14 may extend at an angle of about 45° to the two axes of rotation (when viewed in a direction perpendicular to the two axes of rotation).

The arrangement shown in FIG. 8 may have the advantage that it may be easier to implement in the space available. On the other hand, the arrangement shown in FIG. 9 has the advantage that the amplification of the tilt movement about both axis of rotation is more equal.

FIGS. 8 and 9 show the underside of the gimbal 20. In the arrangement shown in FIG. 8, one end of the SMA wires 14 is connected to the gimbal 20. The other end of the SMA wires is connected to the static part. Hence, in the view of FIGS. 8 and 9, the SMA wires extend from the gimbal up and out of the page towards to the reader. Desirably, the distance travelled by the SMA wires 14 in the direction into-and-out-from the paper in the orientation shown in FIGS. 8 and 9 is as large as possible. This increases the amplification of the tilt motions around the axis of rotation.

Figure 10:
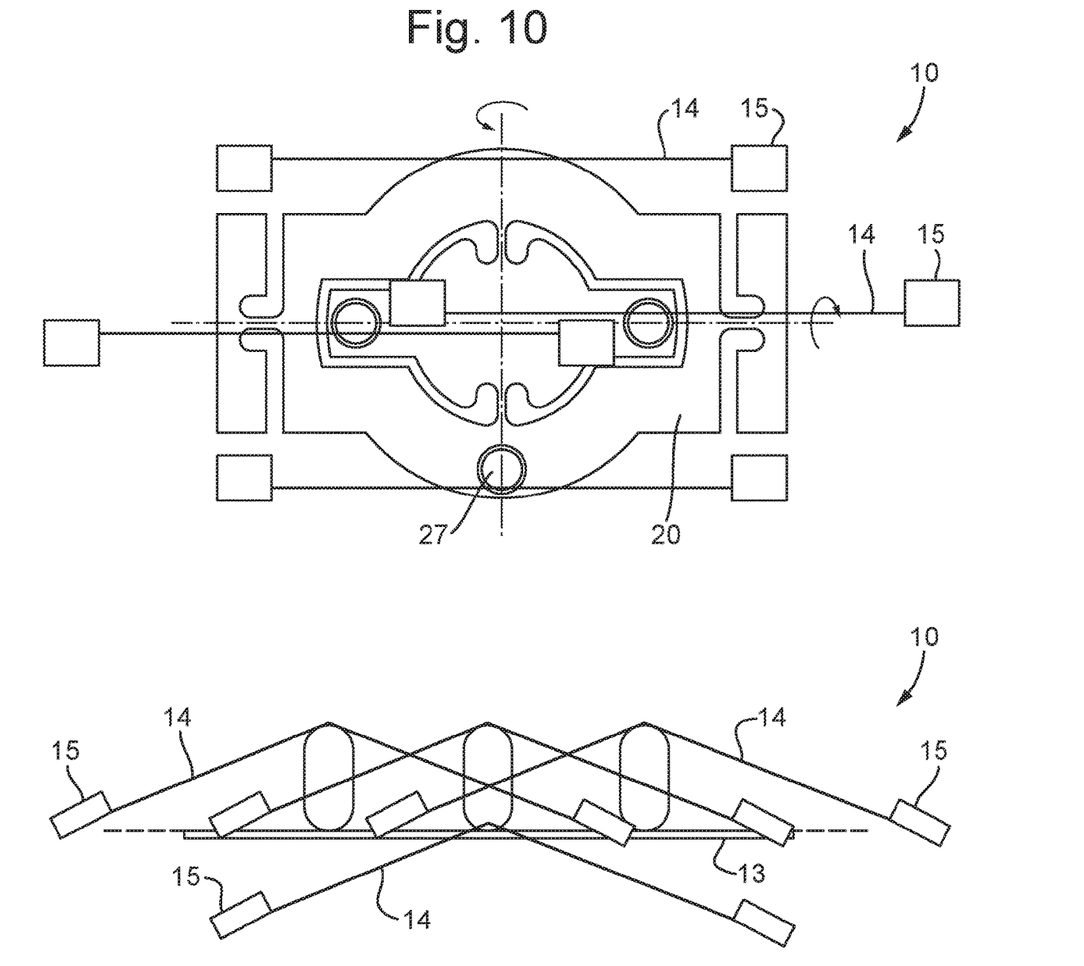

The possibility was described above of having the SMA wires 14 hooked at a midpoint. FIG. 10 shows such an arrangement with the SMA wires hooked in V-shape and connected to the gimbal 20. The top drawing of FIG. 10 is a view of the underside of the gimbal 20. The bottom drawing of FIG. 10 is a vertical cross-sectional view of the same actuator assembly 10. As depicted in FIG. 10, the SMA wires 14 are connected at their midpoint to the gimbal 20. The V-shaped SMA wires 14 shown in FIG. 10 have both ends attached to the static part. The centre of the SMA wires 14 is hooked on the moving object 11, specifically on the gimbal 20. The midpoints of the SMA wires 14 may either be directly connected to the gimbal 20, or via a pivot element 27, as shown in FIG. 10. The pivot element 27 may be a pillar or column extending between the midpoint of the SMA wire 14 and the gimbal 20. In the arrangement shown in FIG. 10, three of the SMA wires are connected to the gimbal 20 via such a pivot element 27, with the other connected more directly. This allows the actuation to be created from two levels, which may be desirable depending on the shape of the space available. For example, as shown in FIG. 6, the space available may have a shape that has a greater z-height dimension available in one section compared to another.

In the arrangement shown in FIG. 10, the actuator assembly 10 comprises four V-shaped SMA wires 14. The SMA wires 14 are paired so that each SMA wire 14 opposes another SMA wire 14 (for rotation around an axis). The arrangement shown in FIG. 10 has the advantage that the amplification of tilt motion about both axes of rotation can be made equal. As with the arrangements shown in FIGS. 8 and 9, it is desirable for the SMA wires 14 to extend as far as possible in the direction perpendicular to the plane of the gimbal 20 so as to increase the amplification of the tilt motion upon contraction of the SMA wires 14.

Figure 11:
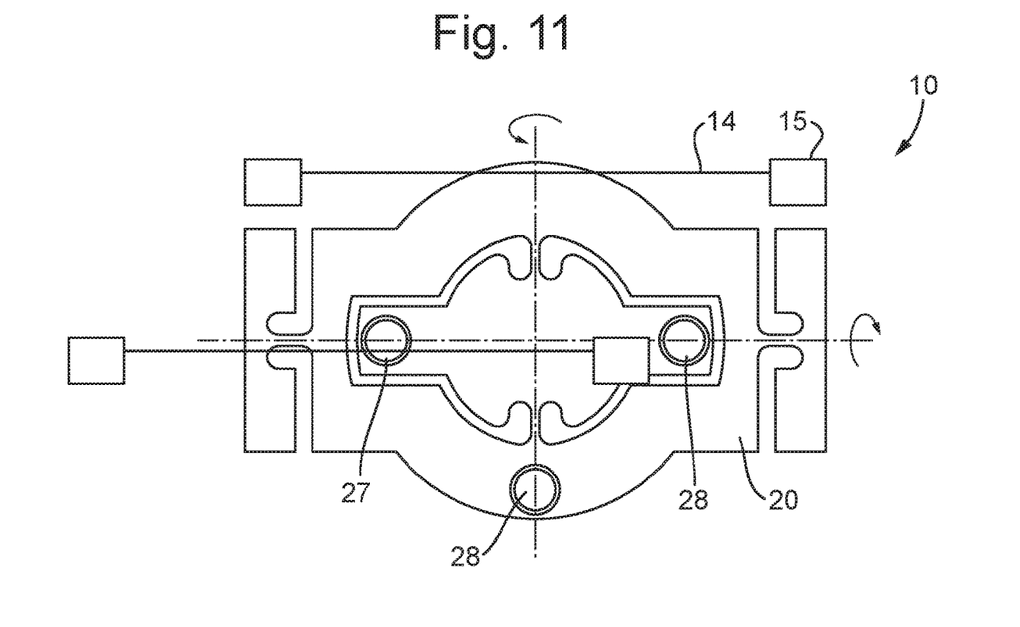

FIG. 11 schematically depicts an alternative arrangement in which for each axis of rotation, one of the SMA wires 14 and a spring 28 are arranged to provide opposing forces for tilting the mirror 12 or prism. Hence, the actuator assembly 10 depicted in FIG. 11 comprises 2 V-shaped SMA wires 14 and two springs 28. For each axis of rotation, there is one V-shaped SMA wire 14 and a spring 28. Desirably, the SMA wires 14 and the springs 28 are arranged such that the amplification of tilt motion (per amount of contraction of the SMA wires 14) is equal for the two axes of rotation.

In the arrangements shown in in FIG. 11, when the SMA wire 14 associated with one of the axes of rotation is contracted (e.g. by heating), one end of the central platform 26 (or alternatively the outer platform 25) of the gimbal 20 is actuated to moved closer to the static part. This causes the other side of the central platform 26 to move away from the static part. When the SMA wire is no longer contracted, the central platform 26 returns to its original position due to the returning force of the spring 28. As with the arrangements shown in FIGS. 8 to 10, it is desirable for the V-shaped SMA wires 14 to extend as far as possible in the direction perpendicular to the plane of the gimbal 20 shown in FIG. 11. This is so as to increase the amplification of tilting motion.

The arrangements shown in FIGS. 8 to 10 do not rely on any spring 28 providing a returning force. These arrangements have the advantage of reducing stress in the torsional parts 22, 23 of the gimbal 20 that could be caused by preloading of the springs 28.

Figure 13:
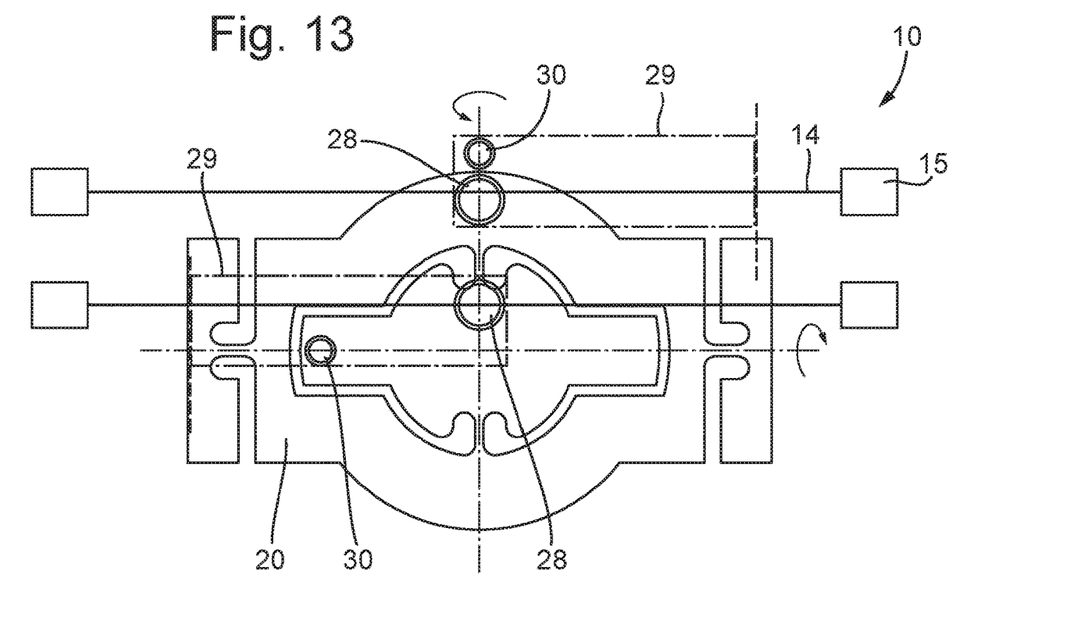

FIG. 13 schematically depicts a further alternative arrangement of the actuator assembly 10. The actuator assembly 10 shown in FIG. 13 is a modification of the actuator assembly shown in FIG. 11. As with the arrangement shown in FIG. 11, the actuator assembly 10 comprises two V-shaped SMA wires 14 and paired springs 28. In the arrangements shown in FIG. 13, the springs 28 act through levers 29.

Figure 12:
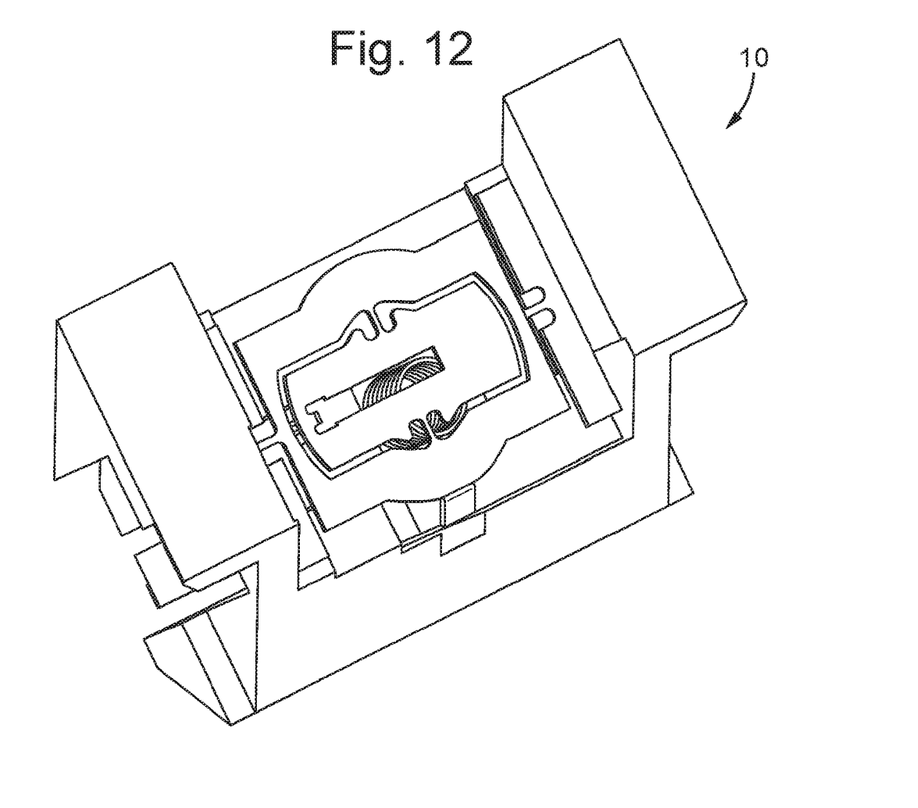

FIG. 12 schematically depicts a perspective view of the actuator assembly 10 shown in FIG. 13.

In the arrangements shown in FIGS. 7 to 13, the gimbal 20 is arranged to allow the mirror 12 or prism to tilt about two perpendicular axes. However, it is not essential for the rotation to be about two perpendicular axes.

Figure 14:
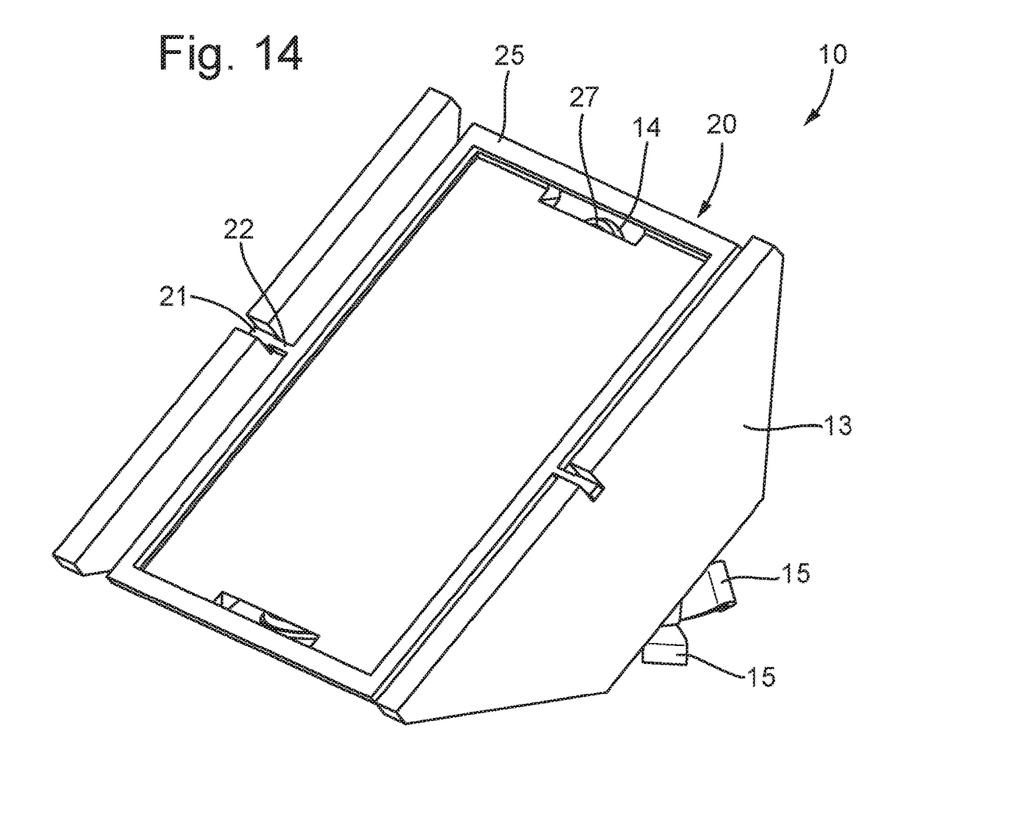
FIGS. 14 and 15 are perspective views of an actuator assembly for tilting about one axis using a torsional arrangement.

FIG. 14 is a perspective view of an arrangement in which tilting is provided about only one axis of rotation. This simplifies the arrangement of the invention. As depicted in FIG. 14, the actuator assembly 10 comprises a gimbal 20 having fixed parts 21 and torsional parts 22 (on either side of the gimbal 20). The fixed parts 20 and the torsional parts 22 lie substantially along the axis of rotation. The gimbal 20 comprises an outer platform 25 that represents the mounting part of the flexure on which the mirror 12 or prism rests. The actuator assembly 10 comprises a support 13, fixed to a case. The support 13 may form part of the static part of the actuator assembly 10. The fixed parts 21 of the gimbal 20 are fixed to the support 13. For example, as shown in FIG. 14, the fixed parts 21 may snugly fit into grooves in the support 13.

Figure 15:
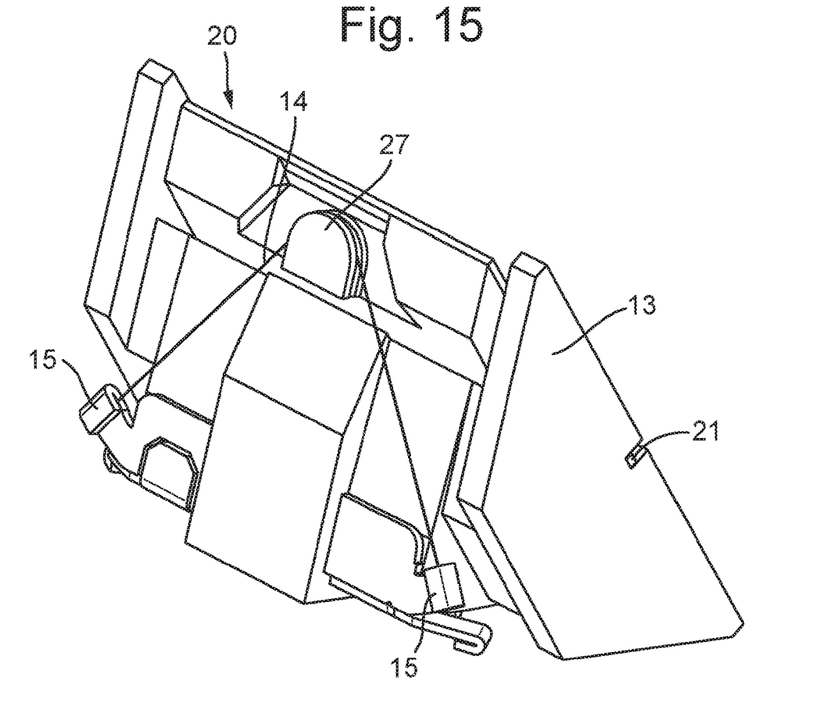

FIG. 15 shows the underside of the actuator assembly 10 of FIG. 14. Two SMA wires 14 are provided. Each SMA wire 14 is hooked about a pivot element 27 that is connected to the gimbal 20. The SMA wires 14 are connected at their ends by connection points 15 (e.g. crimps) to the static part of the actuator assembly 10. When the SMA wires 14 are heated so that they contract, a force is exerted on the pivot element 27, thereby causing the outer platform 25 of the gimbal 20 to be pulled. This causes tilting of the outer platform 25, and hence the mirror 12 or prism. The tilting is caused by the difference in force applied by the two opposing SMA wires 14.

Figure 16:
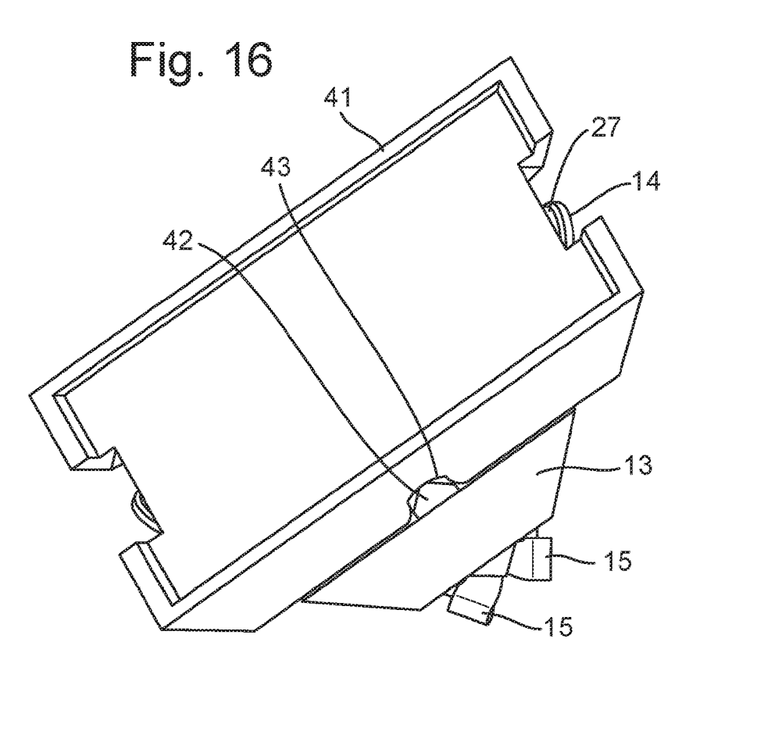
FIGS. 16 and 17 are schematic perspective views of an actuator assembly for tilting about one axis using alternative pivots.
Figure 17:
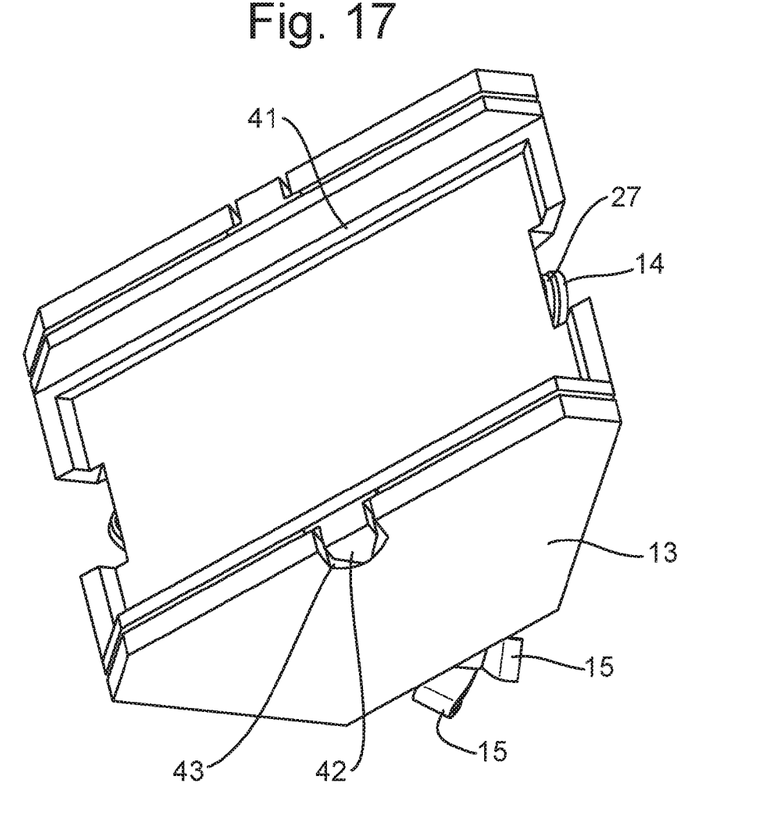

In the arrangements shown in FIGS. 7 to 14, the mirror 12 or prism is allowed to rotate about the axis (or axes) of rotation by twisting of a torsional part, 22, 23. However, it is not essential for the tilting to be provided by torsion. FIGS. 16 and 17 illustrate alternative arrangements in which different types of rocking pivot are used to allow for the tilting action.

As depicted in FIG. 16, the actuator assembly 10 comprises a tilting platform 41 on which the mirror 12 or prism is supported. The tilting platform 41 is configured to tilt on a pivot point 42. The pivot point 42 is fixed to the support 13 that is part of the static part. The tilt platform 41 comprises a groove 43 on its underside to fit around the pivot point 42. When an SMA wire 14 is heated so that it contracts, the tilt platform 41 tilts on the pivot point 42.

FIG. 17 schematically depicts an alternative pivoting mechanism. In the arrangement shown in FIG. 17, the pivot point 42 is fixed to the tilt platform 41. The grooves 43 are provided in the support 13. The pivot point 42 fits in the groove 43 so as to allow the tilt platform 41 to tilt about the axis of rotation.

Figure 18:
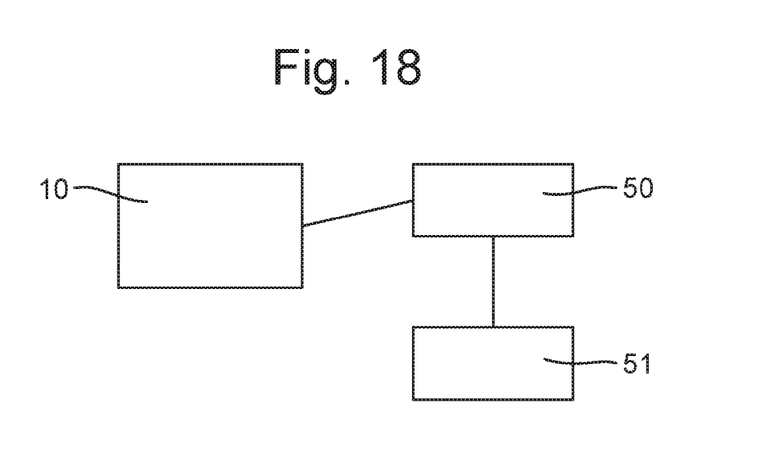
FIG. 18 is a schematic box diagram of a control system for controlling the actuator assembly.

FIG. 18 is a schematic box diagram of a control system for controlling the actuator assembly 10. In the embodiment of the invention, the SMA wires 14 are driven by a control circuit 50. The control circuit 50 may be implemented in an IC chip for example. In particular, the control circuit 50 generates drive signals for each of the SMA wires 14 and supplies the drives signals to the SMA wires 14.

The control circuit 50 receives the output signal of a gyroscope sensor 51 which acts as a vibration sensor. The gyroscope sensor 51 detects the vibrations that the camera assembly 1 is experiencing and its output signals represent those vibrations, specifically as the angular velocity of the camera assembly 1 in three dimensions. The gyroscope sensor 51 is typically a pair of miniature gyroscopes, for detecting vibration around three axes, being two axes laterally of the light sensitive region of the image sensor 3 and also the optical axis. More generally, larger number of gyroscopes or other types of vibration sensor could be used.

The drive signals are generated by the control circuit 50 in response to the output signals of the gyroscope sensor 51 so as to the drive movement of the movable object 11 to stabilise an image focused by the lens 2 on the image sensor 3, thereby providing OIS. The drive signals may be generated using a resistance feedback control technique.

The invention claimed is:

1. An actuation system comprising:
a shape memory alloy (SMA) actuator assembly to tilt a movable object comprising a mirror or prism relative to a static part, the actuator assembly comprising a plurality of SMA wires, wherein:
the actuator assembly is arranged to tilt the movable object about an axis;
at least one SMA wire is hooked to a feature of one of the movable object and the static part at a location between the ends of the SMA wire;
the feature extends in a direction orthogonal to the axis, forming two sections of the at least one SMA wire on opposing sides of the feature; and
the two sections of the at least one SMA wire are angled relative to each other when viewed in a direction orthogonal to the axis and orthogonal to the direction the feature extends; and
a control circuit configured to drive the actuator assembly to effect optical image stabilisation.

2. The actuation system of claim 1, wherein the actuator assembly is configured to tilt the movable object about two non-parallel axes, wherein one of the two non-parallel axes is the axis.

3. The actuation system of claim 1, wherein:
the axis is a first axis;
the actuator assembly is configured to tilt the movable object about two orthogonal axes; and
the two orthogonal axes are (i) the first axis and (ii) a second axis that is orthogonal to the first axis and orthogonal to the direction the feature extends.

4. The actuation system of claim 1, wherein the actuator assembly comprises at least four SMA wires.

5. The actuation system of claim 1, wherein the actuator assembly comprises a suspension system for supporting the movable object on the static part in a manner allowing the movable object to tilt.

6. The actuation system of claim 1, wherein the SMA wires are each connected at one end to the static part and at the other end to the movable object.

7. The actuation system of claim 1, wherein the SMA wires are each fixed at both ends to the static part and hooked at their midpoint at a feature of the movable object forming two sections each SMA wire on opposing sides of the feature.

8. The actuation system of claim 1, wherein the SMA wires are each fixed at both ends to the movable object and hooked at their midpoint at a feature of the static part, forming two sections of each SMA wire on opposing sides of the feature.

9. The actuation system of claim 7, wherein for each SMA wire, the two sections are angled relative to each other when viewed in a direction orthogonal to the axis and orthogonal to the direction the feature on which the SMA wire is hooked extends.

10. The actuation system of claim 1, wherein the movable object comprises a gimbal on which the mirror or prism is mounted, the gimbal being arranged to allow the mirror or prism to tilt about at the axis.

11. The actuation system of claim 10, wherein:
the axis is a first axis; and
the gimbal is arranged to allow the mirror or prism to tilt about two orthogonal axes; and
the two axes are (i) the first axis and (ii) a second axis that is orthogonal to the first axis and orthogonal to the direction the feature extends.

12. The actuation system of claim 10, wherein the SMA wires are each connected at one end to the static part and at the other end to the gimbal.

13. The actuation system of claim 10, wherein the SMA wires are each fixed at both ends to the static part and hooked at their midpoint at a feature of the gimbal.

14. The actuation system of claim 1, wherein for each axis about which the movable object tilts, one of the SMA wires and a spring are arranged to provide opposing forces for tilting the movable object.

15. The actuation system of claim 1, wherein the at least one SMA wire and a spring acting through a lever are arranged to provide opposing forces for tilting the movable object about the axis.

16. The actuation system of claim 10, wherein the gimbal is arranged to allow the mirror or prism to tilt by torsion of a torsional part of the gimbal.

17. The actuation system of claim 10, wherein the gimbal comprises a rocking pivot arranged to allow the mirror or prism to tilt.

18. The actuation system of claim 10, wherein the gimbal is a unitary piece of metal cut or etched from a metal sheet.

19. The actuation system of claim 18, wherein the metal is steel.

20. The actuation system of claim 1, wherein each SMA wire is arranged, on contraction, to drive displacement of the movable object, the SMA wires being arranged at different positions so that the SMA wires, on contraction, drive tilting of the movable object.

21. A camera assembly comprising:
a shape memory alloy (SMA) actuator assembly to tilt a movable object comprising a mirror or prism relative to a static part, the actuator assembly comprising a plurality of SMA wires, wherein:
the actuator assembly is arranged to tilt the movable object about an axis;
at least one SMA wire is hooked to a feature of one of the movable object and the static part at a location between the ends of the SMA wire;
the feature extends in a direction orthogonal to the axis, forming two sections of the at least one SMA wire on opposing sides of the feature; and
the two sections of the at least one SMA wire are angled relative to each other when viewed in a direction orthogonal to the axis and orthogonal to the direction the feature extends;
a control circuit configured to drive the actuator assembly to effect optical image stabilisation; and
a vibration sensor arranged to generate output signals representative of vibration of the camera assembly, the control circuit being arranged to drive the actuator assembly in response to output signals of the vibration sensor for driving movement of the movable object to stabilise an image captured thereby.

22. The camera assembly of claim 21, wherein the mirror or prism is configured to fold light upstream of a lens of the camera assembly.

23. The camera assembly of claim 21, wherein the camera assembly is a telephoto camera or a zoom camera.

24. The camera assembly of claim 21, wherein the camera assembly comprises lenses of at most 10 mm diameter.

25. The camera assembly of claim 21, wherein the camera assembly comprises an image sensor having a light-sensitive region with a diagonal length of at most 12 mm.

26. A mobile phone comprising:
a shape memory alloy (SMA) actuator assembly to tilt a movable object comprising a mirror or prism relative to a static part, the actuator assembly comprising a plurality of SMA wires, wherein:
the actuator assembly is arranged to tilt the movable object about an axis;
at least one SMA wire is hooked to a feature of one of the movable object and the static part at a location between the ends of the SMA wire;
the feature extends in a direction orthogonal to the axis, forming two sections of the at least one SMA wire on opposing sides of the feature; and
the two sections of the at least one SMA wire are angled relative to each other when viewed in a direction orthogonal to the axis and orthogonal to the direction the feature extends; and
a control circuit configured to drive the actuator assembly to effect optical image stabilisation.

* * * * *